United States Patent [19]

Pangburn

[11] 4,118,812

[45] Oct. 10, 1978

[54] CHILD SEPARATING AND SUPPORT DEVICE

[76] Inventor: William H. Pangburn, 446 Stuart Dr., Brownsburg, Ind. 46112

[21] Appl. No.: 848,784

[22] Filed: Nov. 7, 1977

[51] Int. Cl.² .................................................. A47C 21/00
[52] U.S. Cl. .......................................... 5/92; 5/329; 5/331; 5/327 R
[58] Field of Search .................. 5/92, 93 R, 93 B, 94, 5/327 R, 329, 331; 296/64; 297/125, 384, 389

[56] References Cited

U.S. PATENT DOCUMENTS

| | | | |
|---|---|---|---|
| 2,208,713 | 7/1940 | Wilhelm | 5/329 |
| 2,724,427 | 11/1955 | McCarson | 297/125 |

FOREIGN PATENT DOCUMENTS 894,125 2/1977 Canada ......................................... 5/329

Primary Examiner—Casmir A. Nunberg
Attorney, Agent, or Firm—Woodard, Weikart, Emhardt & Naughton

[57] ABSTRACT

A child separating and support device for a seat of a vehicle includes a first side support member, a second side support member and a shelf member. The first and second side support members are joined to each other along a common top edge and diverging from this common edge making an inverted V-shape when in a supporting orientation. The shelf member is joined to and extends between the first and second side support members in a generally horizontal manner creating an A-frame type of structure.

20 Claims, 7 Drawing Figures

CHILD SEPARATING AND SUPPORT DEVICE

Background of the Invention

This invention relates in general to separating and support devices and in particular to such devices which are used for children.

The concept of attaching supportive and retaining devices for children to rear seat areas of automobiles is not new. There are various designs of infant and small children seats and chairs. For example, the following list of patents provides an indication of such apparata.

| Pat. No. | Inventor | Issue Date |
| --- | --- | --- |
| 2,988,135 | Caminiti | 6/13/61 |
| 3,178,733 | Wachsman | 4/20/65 |
| 3,050,333 | Smith et al. | 8/21/62 |
| 2,724,427 | McCarson | 11/22/55 |
| 3,032,779 | Titley | 5/8/62 |

The device disclosed by Caminiti includes an elevated auxiliary seat which is supported by the rear, upright seat portion and which is further suported by a rigid bar secured to the sides of the rear seat passenger area. This device is merely an auxiliary seat for a small child which incorporates certain features for a more durable design.

The device dislosed by Wachsman is a collapsible back and armrest and although it might be usable in automobiles, its structural arrangement indicates use in conjunction with a bed.

The device of Smith et al. is an auxiliary chair for a child passenger in an automobile similar in intended use and function to the device of Caminiti. However, the device of Smith et al. is specifically designed to be used in automobiles which have laterally spaced backrests for the front seat occupants.

The device of McCarson incorporates a car seat for an infant in combination with a bed for the infant. The device may be readily folded into a compact form for convenient storage. The design of the seat is conventional in that vertical members support a top member from which joined side and front members are suspended.

The device disclosed by Titley, although not relating to infant seats for automobiles, does relate to automobile rear seat accessories. In particular, the device is one which converts the rear passenger area of an automobile into a playpen for a child.

Each of the listed patents discloses a device which is most likely applicable only to relatively young children and infants. Each device includes a modification to a conventional automobile rear seat and suggests that such seats are not acceptable as supporting and retaining means for such children for several reasons. One consideration which is not addressed by any of the listed patents is what can be done with somewhat older children who might have a tendency to argue or fight with each other and who might get sleepy or want to rest on lengthy trips. In addition to being unacceptable for larger children, none of the listed patents disclose, by a single device, means to separate two children. Furthermore, with the exception of Titley, none of the patents provides means for supporting the child's heat in the event the child would like to rest. The device of the Titley patent being convertible into a playpen or crib does provide means for a child to rest but such a device is actually limited to only one larger child because of available space. Also, without a barrier between children, arguing and fighting could not be effectively controlled.

A final consideration is that on lengthy trips most children need items to play with or read or work with. None of the disclosed seat devices provide a suitable storage area for such items so that the items will not be misplaced or damaged while still remaining accessible to the child.

SUMMARY OF THE INVENTION

A child separating and support device according to one embodiment of the present invention includes a first side support member, a second side support member joined to the first side support member along a common top edge and at least one shelf member joined to and extending between the first and second side support members. The first and second side support members diverging from the common top edge.

A separating and support device according to another embodiment of the present invention comprises a first side support member having a series of hinge tabs along one edge, a second side support member having a series of hinge tabs along one edge, means for pivotally connecting the first and second side support members together by means of the hinge tabs and means cooperating with the pivotally connecting means for simultaneously engaging at least one hinge tab of the first side support member and at least one hinge tab of the second side support member, the engaging means being movable between an engaged-locked position and an extracted-free position whereby the side support members are selectively positionable between a fully opened and closed position.

One object of the present invention is to provide an improved separating and support device.

Related objects and advantages of the present invention will be apparent from the following description.

DESCRIPTION OF THE PREFERRED EMBODIMENTS

Figure 1:
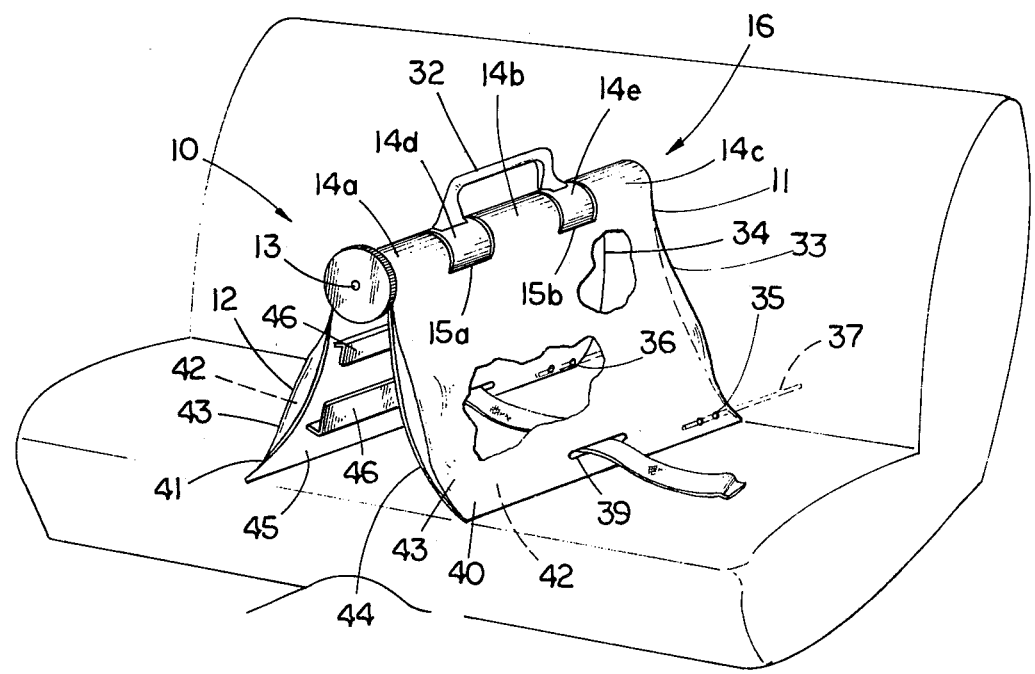
FIG. 1 is a perspective view of a child separating and support device according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
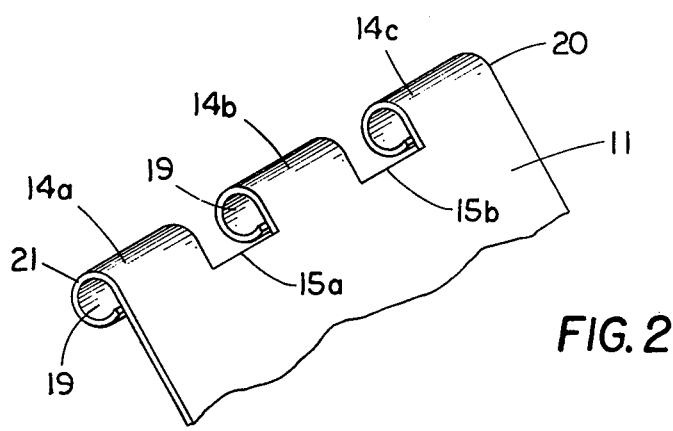
FIG. 2 is a partial perspective view of a side support member comprising a portion of the FIG. 1 device.

Referring to FIG. 1, separating and support device 10 is oriented in an open position as it would be when employed on the seat of a vehicle. This device is able to be used to separate two children so that they are not able to fight while at the same time providing means for one or both children to rest. As desbribed herein, separating and support device 10 includes two side support members 11 and 12, which engage each other along their adjacent upper edges, and hinge pin 13, which provides part of the connecting means for these two side support members. Each side support member as an alteranting series of cylindrically shaped hinge tabs 14a–14e and recesses 15a–15e (15a and 15b shown, 15c, 15d and 15e hidden from view) along common upper edge 16 (see FIG. 2) and the series of tabs and recesses on member 11 is the opposite of that on member 12 so that the two members are able to fit together similar to a conventional door hinge, with the tabs of member 11 fitting into the recesses of member 12 and the tabs of member 12 fitting into the recesses of member 11. The tabs 14a–14e are formed into their resulting cylindrical shape by rolling an elongated strip of material (an extension of the side support member) back onto itself thereby leaving a uniform internal cylindrical opening 19 through the center. The depth of the recesses 15a–15e is such that with the hinge tabs 14a–14e of the opposite side support member in their engagement position, the series of hinge tab cylindrical openings 19 on both side support members are all concentric to each other. The longitudinal axis of these cylindrical openings is substantially coincident with the longitudinal axis of connecting hinge pin 13.

Figure 3:
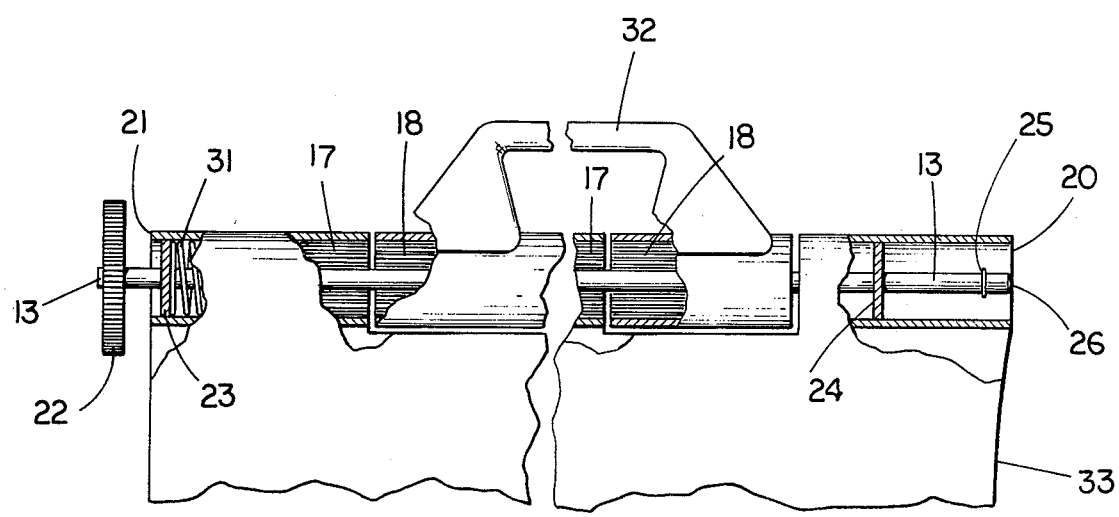
FIG. 3 is a fragmentary view of alternating and internally splined hinge tabs comprising a portion of the FIG. 1 device.

As shown by FIG. 3, member 11 has three hinge tabs 14a, 14b and 14c and two recesses 15a and 15b. Similarly member 12 has two hinge tabs 14d and 14e and three recesses 15c, 15d and 15e. Conventional left-hand and right-hand modifiers are used in the following description, and the FIG., 3 orientation is used as the basis for establishing such modifiers. The right-hand ends of 14a and 14b are formed with a series of internal splines 17 and the left-hand ends of tabs 14d and 14e which are adjacent to tabs 14a and 14b, respectively, are similarly formed with a series of internal splines 18. The approximate length of the splined portion on each end is approximately 0.75 inches making a total continuous internal splined portion at the two locations, of approximately 1.50 inches each. Hinge pin 13 which extends through the concentric cylindrical openings 19 is flush with the right-hand edge 20 of hinge tab 14c. The opposite end of hinge pin 13 extends beyond the left-hand edge 21 of hinge tab 14a and is fitted with a knob 22. Internal to hinge tab 14a and adjacent edge 21 is wall 23 which is solid and closes off cylindrical opening 19 with the exception of an access hole provided for pivot pin 13. At the opposite end of member 11, a similar wall 24 is rigidly secured into tab 14c. Although wall 23 is quite close to the left hand ege 21, wall 24 is inset approximately 1.50 inches from the right-hand edge 20. Snapped into a groove on the right-hand end of hinge pin 13 is a retaining ring 25 which is approximately 1.00 inch from wall 24.

Figure 4:
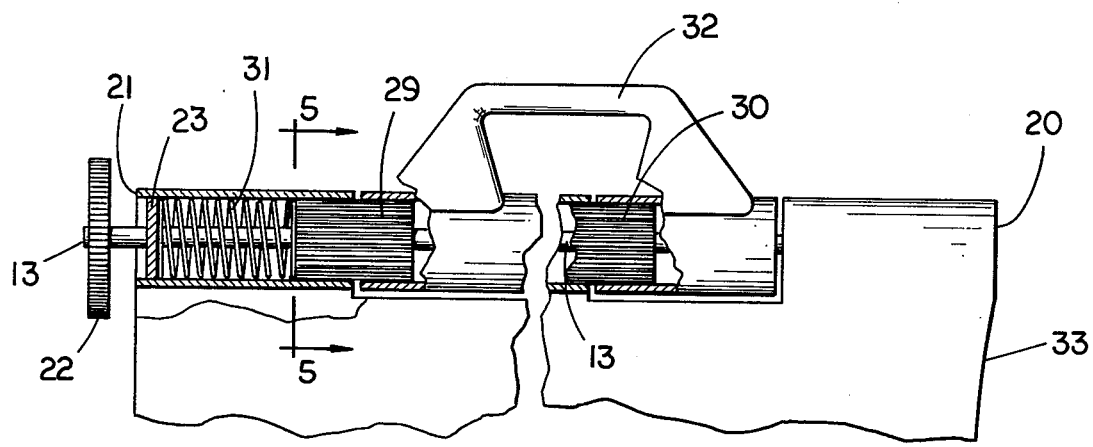
FIG. 4 is a fragmentary view of a spring-loaded pivot pin and splined boss arrangement comprising a portion of the FIG. 1 device.
Figure 5:
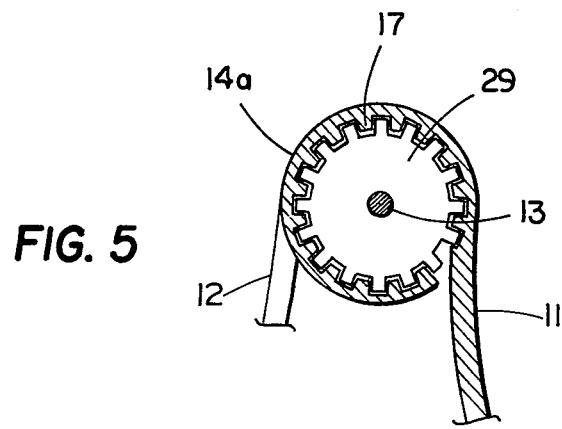
FIG. 5 is a sectional view of a splined boss in engagement with an internally splined hinge tab taken along line 5—5 in FIG. 4.

Referring to FIG. 4, it is shown that pivot pin 13 also includes a pair of externally splined bosses 29 and 30 each of which are concentric with and rigidly secured to hinge pin 13. The approximate length of bosses 29 and 30 is 1.50 inches and when the right-hand end 26 of hinge pin 13 is flush with edge 20, the first boss 29 coincides as to its longitudinal position with the internal splines 17 and 18 of tabs 14a and 14d, respectively. Similarly, the second boss 30 coincides as to its longitudinal position with the internal splines 17 and 18 of hinge tabs 14b and 14e, respectively. The external splines of bosses 29 and 30 are equal in number to the internal splines in the corresponding hinge tabs and the diameter size and shape of the external splines permit full engagement with the internal splines 17 and 18 as shown in FIG. 5. Positioned around hinge pin 13 and extending between first boss 29 and wall 23 is a compression spring 31 which is at its free length when bosses 29 and 30 are coincident as to their longitudinal position with the internal spline portions of hinge tabs 14a, 14b, 14d and 14e. With bosses 29 and 30 engaging the internal spline tab portions of both side support members 11 and 12 simultaneously, neither member is able to be pivoted closer together or farther apart relative to the other. The attempted movement of one side support member is equally and oppositely acted against by the other side support member. The hinge pin and boss arrangement is unable to turn when the internal and external splines are engaged and thus the two side support members are securely locked into their particular position as of this engagement.

In order to selectively position side support members 11 and 12 relative to each other between fully-opened and closed positions, the following must be done. First, by gripping knob 23 and pulling outwardly a distance of approximately 1.00 inch, bosses 29 and 30 will be extracted out of and disengaged from the internally splined hinge tabs 14d and 14e of member 12. Due to the length of the splined portions of the hinge tabs and the length of bosses 29 and 30, each boss will remain in engagement with the internal splines of the corresponding hinge tabs of member 11. In this condition, the turning of knob 22 will permit member 11 to pivot relative to member 12 and the side support members are able to be placed in a new position. Spring 31 which was compressed between wall 23 and boss 29 when knob 22 was pulled in an outwardly direction provides a sufficient spring force in order to push bosses 29 and 30 back into engagement with both sets of splined, adjacent hinge tab to once again lock the two side support members into position. It sould be noted that in the event the splines of bosses 29 and 30 do not precisely coincide with the spaces between the splines of the hinge tabs during this spring-loaded reentry, the number of individual splines is large enough that only minor movement of the side support members is necessary in order to establish alignment so that bosses 29 and 30 can become fully engaged with the hinge tabs. The distance that control knob 22 can be pulled out is limited by the distance between retaining ring 25 and wall 24 and this distance is sufficient to permit bosses 29 and 30 to become disengaged from hinge tabs 14d and 14e while still remaining in engagement with hinge tabs 14a and 14b. There is an opening in wall 24 which is only sufficient for hinge pin 13 to pass and when the retaining ring 25 reaches wall 24, the outward movement of knob 22 and hinge pin 13 is halted. Also the depth of reentry of bosses 29 and 30 into hinge tabs 14d and 14e is controlled in that spring 31 returns to its free length which was such that each boss 29 and 30 was longitudinally coincident with the internally splined portions of adjacent hinge tabs.

Returning to FIG. 1 additional features are shown which add to the usefulness of the present device. Attached to the upper surface of tabs 14d and 14e is a handle 32 which is used to carry the separating and support device 10 when it is not in use. This handle also provides means by which the entire device can be held in position while knob 22, which is knurled for easier gripping, is being pulled outwardly and turned so as to change the position of the side support members. The positional arrangement between handle 32 and knob 22 allow passengers sitting in the front seat of an automobile to be able to turn around and adjust side support members 11 and 12 without having to stop the car to go into a more elaborate procedure in order to make this adjustment.

The rear edges 33 and 34 of members 11 and 12, respectively, are contoured so as to fit the general curvature of automobile rear seats. Of course, if this device is used with different vehicles such as trains or buses, the shape of rear edges 33 and 34 might not be as close to the exact contour of the seat as they would be with automobiles but such side support members will still be acceptable for use in such other vehicles. The greater the degree of softness and cushion to the vertical portion of the rear seat, the more likely it will be that a single rear edge contour will match the particular seat portion. Extending rearwardly from the lower rear corner of each side support member is a support bar 37 which is secured by suitable fasteners such as screws 35 and nuts 36. These bars are removable from the side support members in the event the bars might not be desired for a particular type of automobile or application. However, for most types of vehicles, these support bars will provide an effective means for securely holding device 10 in position. The bars 37 are inserted between the vertical and horizontal rear seat portions which then act to clamp the bars. A further retaining and securing feature is provided by means of slots 39, there being one in each side support member. These slots are sized and positioned so that an automobile safety belt may be passed therethrough and locked. Either or both of these retaining means (bars 37 and slots 39) may be used to secure device 10 into position. The use of the safety belt will likely be acceptable only for those automobiles which have three rear seat safety belts so that both children can also have their safety belts on at the same time device 10 is secured into position.

The majority of the surface area of outwardly facing surfaces 40 and 41 of side support members 11 and 12, respectively, is padded with a soft material 42 such as synthetic foam or foam rubber as used in cushions and pillows. This padding material is covered with cloth 43. The foundation of each side support member is plastic such as high-impact polystyrene and the padding is laid over this foundation and then sealed in place by means of the cloth cover whose edges are secured to the foundation of the side support member by means of a suitable adhesive. This edge attachment of the cloth cover allows the degree of padding to be changed as well as replaced without necessitating a completely new device.

In order to utilize some of the rear seat space which is taken up by the use of device 10, the inner surfaces 44 and 45 of side support members 11 and 12, respectively, are equipped with guides 46 into which books, papers, magazines and the like can be placed and retained. This allows each child to keep his own materials separate from the other child's while providing means for such materials to be protected from bending or tearing or loss. It is important on a lengthy trip with two small children that they be provided items to play with and to occupy their time and that the children be kept separated from each other if it is likely that they might tend to fight or argue. Furthermore, either child may want to sleep and without a suitable divider a resting child may interfere with the child who is awake or the child who is awake may bother the child who is trying to rest. The use of the described device will resolve these problems. The children may rest against the padded surface if they are tired, the device keeps them apart from one another so that there is a less likely tendency to fight or argue and there are storage provisions within device 10 for each child to keep his own materials separate from the other child's materials.

Figure 6:
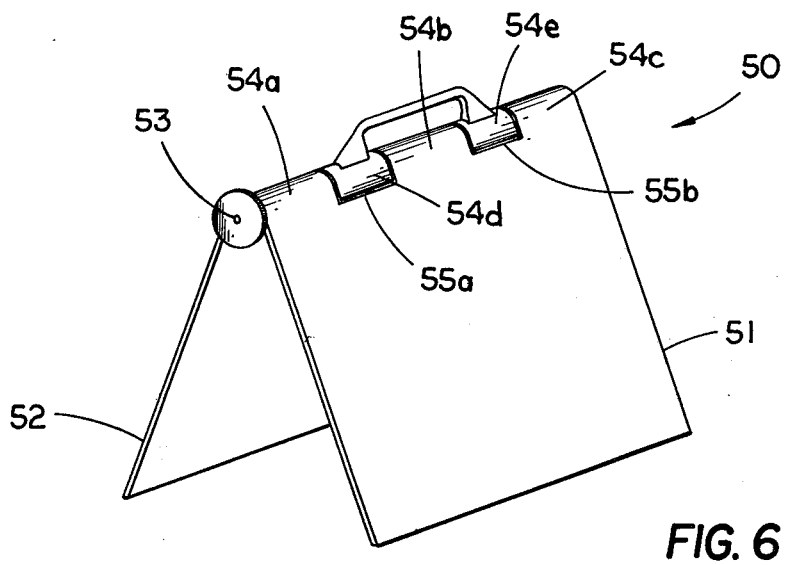
FIG. 6 is a perspective view of a separating and support device according to an alternate embodiment of the present invention.

Referring to FIG. 6, there is illustrated a separating and support device 50 which is similar in outward appearance to device 10, although structured slightly differently for other applications. Device 50 includes side support members 51 and 52, hinge pin 53, hinge tabs 54a–54e and recesses 55a–55e (only 55a and 55b being shown, the others being hidden from view). The design and construction of the pivoting mechanism of device 50 is virtually the same as the pivoting mechanism of device 10, including the internal and external splines, the compression spring, inner walls and the retaining ring.

Side support members 51 and 52 are substantially smooth and flat and may be constructed of lightweight, durable material such as plastic. Although device 50 may be virtually any size depending on what it is used to support and/or separate, one application for device 50 is as a portable display device for salesmen. Such a device could be sized to be folded and placed in a briefcase when not in use, and when desired, opened and used as a display rack for notebooks, pictures, pamphlets and the like.

The alternative form represented by device 50 does not require padding surfaces, nor does it require support bars or safety belt slots. The inclusion of guides on the inner surfaces of side support members 51 and 52 could be an added option depending upon the intended application.

Device 50 also has applicability as a support and display surface for magazines, notebooks, pictures and the like and can be used by a student to support books and other materials in an upright orientation so that they can be easily read.

Yet another use for device 50 is as a divider for the rear seat of an automobile whereby stacks of different materials, such as a traveling salesman might carry, can be kept separated from each other into individual units.

Figure 7:
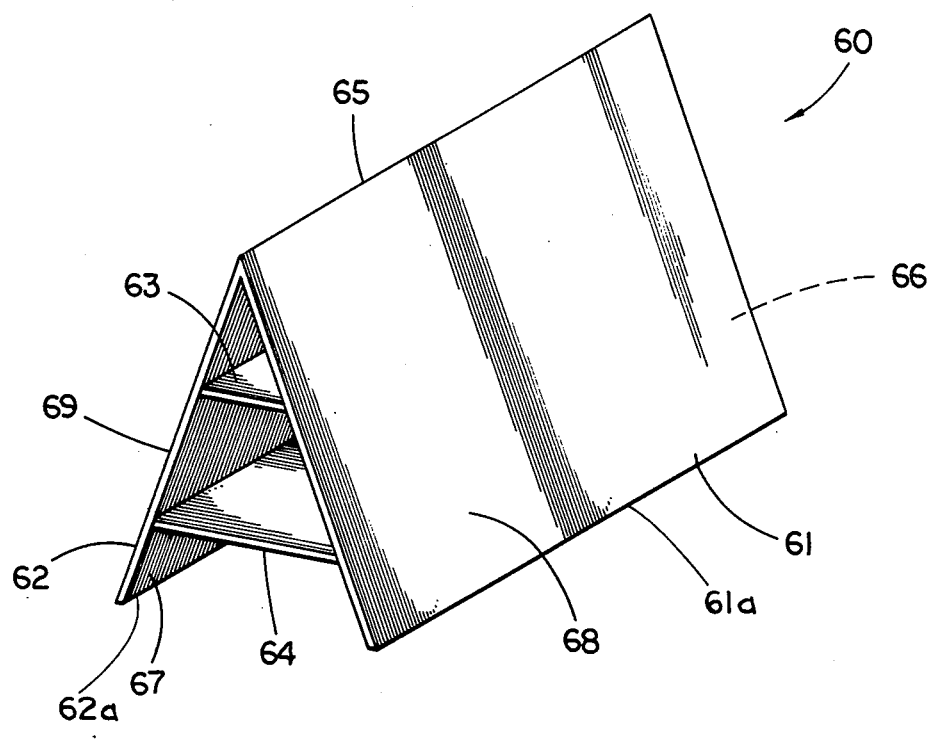
FIG. 7 is a perspective view of a child separating and support device according to an alternate embodiment of the present invention.

Another embodiment of a child separating and support device is illustrated by FIG. 7 wherein device 60 includes two side support members 61 and 62, upper support shelf 63 and lower support shelf 64. The two side support members which are joined to each other along common top edge 65 diverge from common top edge 65 thereby forming an inverted V shape. Support shelves 63 and 64 which are joined to inner surfaces 66 67 of side support members 61 and 62, respectively, are generally horizontal with respect to device 60 and creare an A-frame type of structure with members 61 and 62. The size and degree of separation between side support members 61 and 62 are selected so as to fit on the rear seat of an automobile and leave sufficient space on each side for a child to sit comfortably. Support shelves 63 and 64 provide rigidity to device 60 while at the same time providing storage areas for books, papers, crayons, toys and similar items children might use while riding in an automobile. The width of each shelf 63 and 64 governs the height at which the particular shelf will be contiguous to inner surfaces 66 and 67. Thus, the widths of shelves 63 and 64 govern the height clearance between shelf 64 and shelf 63 and the height clearance between shelf 63 and edge 65. Although shelf 64 is illustrated as being joined to members 61 and 62 a few inches above bottom edges 61a and 62a so that device 60 will actually rest on the seat of the automobile or other vehicle by means of edges 61a and 62a and will not rest on bottom shelf 64, it is possible to mount shelf 64 flush with edges 61a and 62 and use the underside of shelf 64 as the supporting surface for device 60. Although side support members 61 and 62 and support shelves 63 and 64 may be constructed of materials such as plastic, the preferred material is wood and the various wooden members may be glued together, or nailed, or both. The outer surfaces 68 and 69 of side support members 61 and 62, respectively, may be left bare and used in conjunction with a pillow or cushion in order to provide a soft resting area for the children which are separated by device 60. However, an equally acceptable design is to cover a majority of the area of outer surfaces 68 and 69 with a padding material similar to that described for device 10. This padding material will permit device 60 as a single unit to be used as a separator for the two children while providing at the same time a comfortable surface against which the children may rest.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A child separating and support device for a seat of a vehicle which comprises:
   a first side support member;
   a second side support member rigidly joined to said first side support member along a common top edge, said first and second side support members each including a bottom edge and each diverging from said common top edge toward their corresponding bottom edge; and
   a least one shelf member joined to and extending between said first and second side support members and being disposed between said common top edge and said bottom edges.

2. The child separating and support device of claim 1 wherein said support members and said shelf member are constructed of wood.

3. The child separating and support device of claim 2 wherein each of said side support members are padded.

4. The child separating and support device of claim 3 wherein said shelf member is arranged generally horizontal to the seat of the vehicle on which the device is positioned.

5. A separating and support device which comprises:
   a first side support member;
   a second side support member;
   means for pivotally connecting said first side support member to said second side support member; and
   means cooperating with said connecting means for selectively positioning one side support member relative to the other side support member at any one of several intermediate positions between a fully opened position and a closed position.

6. The device of claim 5 wherein each of said side support members includes a plurality of hinge tabs along a top edge.

7. A separating and support device which comprises:
   a first side support member;
   a second side support member;
   means for pivotally connecting said first side support member to said second side support member;
   means cooperating with said connecting means for selectively varying the extent of pivotal separation between said first and second side support members;
   each of said side support members including a plurality of hinge tabs along a top edge; and
   said connecting means including a hinge pin passing through each of said plurality of hinge tabs thereby pivotally connecting said top edges together.

8. A separating and support device which comprises:
   a first side support member having a series of hinge tabs along one edge;
   a second side support member having a series of hinge tabs along one edge;
   said hinge tabs of said first side support member fitting inbetween said hinge tabs of said second side support member;
   means for pivotally connecting said first and second side support members together by means of said hinge tabs; and
   means cooperating with said pivotally connecting means for simultaneously engaging at least one of said hinge tabs of said first side support member and at least one of said hinge tabs of said second side support member, said engaging means being movable between an engaged-locked position and an extracted-free position, whereby said side support members are selectively positionable between a fully-opened and closed position.

9. The device of claim 8 in which said pivotally connecting means includes a hinge pin supported at opposite ends of said first side support member and extending through each of said hinge tabs on said side support members.

10. The device of claim 9 in which said engaging means comprises:
    a series of internal splines within adjacent ones of said hinge tabs of said first and second side support members;
    at least one externally splined boss member connected to said hinge pin; and
    said externally splined boss member being longitudinally coincident with said adjacent ones of said hinge tabs and engaging said internal splines whereby said first and second side support members are locked in their corresponding hinged position as of said engagement by said splined boss member.

11. The device of claim 10 in which said engaging means further comprises:

a spring member acting at one end of said first side support member between said externally splined boss member and one end of said side support member; and a knob attached to said hinge pin for extracting said externally splined boss member out of engagement with said hinge tabs of one of said side support members whereby the other side support member is free to be pivoted relative to said one side support member by means of said externally splined boss member.

12. The device of claim 11 in which said first and second side support members are provided with a layer of padding material on their outwardly facing surfaces.

13. The device of claim 12 wherein said first and second side support members further include slots through which a vehicle safety belt may be passed in order to retain said device in a fixed position.

14. The device of claim 13 in which said first and second side support members each include a retaining bar attached to a lower edge and extending rearwardly.

15. The device of claim 14 in which said first and second side support members each include guide trays attached to inwardly facing surfaces of said side support members.

16. The device of claim 15 in which said hinge pin includes means for controlling the extent of travel of said hinge pin as it is extracted from said device.

17. The device of claim 16 which further includes a handle member attached to the upper surface of said hinge tabs of said second side support member.

18. The device of claim 17 in which said vehicle has a horizontal and a vertical seat portion and the rear edges of said first and second side support members are contoured in order to conform to the general shape of said vertical seat portion.

19. The device of claim 18 in which said first and second side support members, said hinge pin and each splined boss are constructed of plastic.

20. The combination of:

a vehicle seat having a vertical portion; and a separating and support device positioned on said vertical portion which comprises:

a first side support member;

a second side support member joined to said first side support member along a common top edge, said first and second side support members each including a bottom edge and each diverging from said common top edge toward their corresponding bottom edge; and shelf means for bracing said first and second side support members in said diverging arrangement, said shelf means being located between said common top edge and said bottom edges.

* * * * *

UNITED STATES PATENT AND TRADEMARK OFFICE
CERTIFICATE OF CORRECTION

PATENT NO. : 4,118,812
DATED : October 10, 1978
INVENTOR(S) : William H. Pangburn It is certified that error appears in the above–identified patent and that said Letters Patent are hereby corrected as shown below:

In column 7, line 61, after the word "said" and before the word "support" please insert --side--.

In column 9, line 3, after the word "said" and before the word "side" please insert --first--.

Signed and Sealed this

Sixth Day of February 1979

[SEAL]

Attest:

RUTH C. MASON
Attesting Officer

DONALD W. BANNER
Commissioner of Patents and Trademarks